(12) United States Patent
Cambronero González

(10) Patent No.: US 12,703,202 B2
(45) Date of Patent: Aug. 11, 2026

(54) INTERNAL CONNECTION OF A BICYCLE REAR HUB

(71) Applicant: ORBEA, S. COOP., Mallabia (ES)

(72) Inventor: Juan Carlos Cambronero González, Mallabia (ES)

(73) Assignee: ORBEA, S. COOP., Mallabia (ES)

(*) Notice: Subject to any disclaimer, the term of this patent is extended or adjusted under 35 U.S.C. 154(b) by 357 days.

(21) Appl. No.: 18/484,046

(22) Filed: Oct. 10, 2023

(65) Prior Publication Data

US 2024/0131863 A1 Apr. 25, 2024
US 2024/0227440 A9 Jul. 11, 2024

(30) Foreign Application Priority Data

Oct. 20, 2022 (EP) .................................... 22383008

(51) Int. Cl.

*B60B 27/02* (2006.01)
*B60B 27/00* (2006.01)
*B60B 27/04* (2006.01)
*F16D 41/24* (2006.01)

(52) U.S. Cl.

CPC ........ *B60B 27/023* (2013.01); *B60B 27/0094* (2013.01); *B60B 27/047* (2013.01); *B60B 27/0026* (2013.01); *F16D 41/24* (2013.01)

(58) Field of Classification Search

CPC . B60B 27/023; B60B 27/047; B60B 27/0026; B60B 2310/307; F16D 41/24; F16D 41/36; F16D 41/32

See application file for complete search history.

(56) References Cited

U.S. PATENT DOCUMENTS 6,123,179 A * 9/2000 Chen ...................... F16D 41/36 192/64
6,478,128 B2 11/2002 Taylor
2018/0345724 A1* 12/2018 Chen ..................... B60B 27/023
2022/0161597 A1 5/2022 Lin

FOREIGN PATENT DOCUMENTS

EP 1121255 4/2003

* cited by examiner

*Primary Examiner* — Timothy Hannon
(74) *Attorney, Agent, or Firm* — FisherBroyles, LLP; Roger L. Browdy; Ronni S. Jillions

(57) ABSTRACT

An internal connection of a rear bicycle wheel hub is provided including a cylindrical body that surrounds an axle, where a proximal end of the body is attached to a freehub body that surrounds a freewheel system. A connecting mechanism between the body and the freewheel system of the freehub body includes a connecting crown coupled to an inner surface of the body that connects with a ring in the freewheel system and an elastic ring seated in a circular recess on a lateral surface of the connecting crown so that it can expand towards the inner surface of the body and fix the connecting crown inside the body.

7 Claims, 4 Drawing Sheets

INTERNAL CONNECTION OF A BICYCLE REAR HUB

FIELD OF THE INVENTION

The present invention relates to the rear hub of a bicycle wheel and, more particularly, to the connection between the hub body and the freehub.

PRIOR ART

The rear hub of a bicycle wheel is a fundamental part of the wheel. The hub surrounds the axle of the wheel and joins the ends of the spokes. In addition, the hub houses the brake disc on one side and serves as a support for the sprocket cassette on the other side, which transmits the movement of the pedals to the wheel so that it turns.

Normally, the most widely known hubs comprise a hollow cylindrical body with an axle running through it, where the brake disc is attached to a distal end by means of a locking system, and what is known as the cassette core or freehub body is attached to the proximal end, to which the sprockets, forming the cassette, are fixed. In this way, the freehub body is the most important part of the freewheel effect, i.e. that the wheel can continue to rotate, even if pedalling stops. There are at least two types of bicycle rear hubs, depending on the internal design of the freehub; with a freehub body that contains pawls or with a freehub body that contains rings with angled teeth, commonly called the ratchet type.

On the one hand, pawl freehubs comprise a body that comprises a threaded connecting part with angled teeth on an inner surface and screw threading externally, i.e. the thread joins the threaded connecting part to the body of the hub and the wedge-shaped teeth are the complementary geometry to the at least three pawls arranged on the outer radial surface of the freehub. Therefore, when the freehub body rotates in the direction of travel or forward when pedalling, the pawls engage and are locked in the flat part of the teeth, making the whole part turn, and then when pedalling stops, they slide easily along the inclined part of the tooth when turning in the opposite direction to the direction of travel or backwards.

On the other hand, the hub commonly called a ratchet hub comprises a system of toothed rings like that shown in FIGS. 1 and 1A, i.e. it comprises a body with an externally threaded connecting part that is fixed to the body, while the internal geometry of the connecting part can be complementary to the outer surface of a ring, which can generally be externally and laterally toothed as seen in FIG. 1A. In this way, as with the operation of a pawl system, the rings comprise equal and complementary teeth facing each other, so that when the parts rotates in the direction of pedalling, the teeth mesh, turning the entire part, while when pedalling stops or is reversed, some springs outside the rings allow them to be released and rotate free of each other, allowing the wheel to continue turning.

Furthermore, inside the rear hub there are several wheel bearings arranged in different positions and different ends of the body to facilitate turning, a connecting mechanism between the body and the freehub, and the ratchet ring or pawl systems mentioned above.

At present, the connecting mechanism between the body and the freehub body is generally a part that is radially threaded on its outer surface and engages by screwing into the inner surface of the hub body so that it is fixed and does not come out during pedalling as seen in FIGS. 1 and 1A. The inner surface may comprise a shape that fits one of the rings in the ring system or the pawls; or it may have a lateral toothed surface that engages the lateral surface of the ring directly in the freewheel system.

In any of the previously explained and known cases, the connecting part is an externally threaded part, so that each time the user pedals, this connecting part tightens more and more around the body of the hub. As a result, when it needs to be replaced due to wear or tear, it is often difficult to loosen given the degree of tightening, corrosion or other factors. Moreover, in cases where it is possible to replace it without having to change the entire hub, a special, difficult-to-find tool will be needed, as well as requiring a minimum amount of knowledge about how to use it.

For all of the aforementioned reasons, the objective of the invention is a bicycle rear hub with improved internal connection between the body and the freehub, which facilitates the replacement or disassembly of this connecting part without the need for special tools, facilitating and reducing the cost of maintenance and prolonging the life of the hub and therefore of the wheel.

BRIEF DESCRIPTION OF THE INVENTION

The object of the invention is a bicycle wheel rear hub with an improved connecting system. The hub comprises a hollow cylindrical body to hold an axle, with at least one wheel bearing at each end. A brake disc is attached to an outer distal end of the body, which is fixed by means of a threaded nut to the body, or by the use of screws. At the other proximal end, next to the wheel bearing, there is a connecting mechanism to join the hub body to the freehub, where the sprocket cassette is fixed by means of a threaded cap on the proximal end of the hub.

The freehub body also comprises a cylindrical body, where inside there is a freewheel system characterized in that the connecting mechanism for joining the hub body to the freehub body comprises a connecting crown which is preferably crenellated and splined on the outside and toothed on the inside, and an elastic ring to fix the connecting crown to the body of the hub. The connecting crown comprises a lateral surface with a circular recess towards the proximal end of the body where the elastic ring is attached on the outer surface so that it can expand towards the inner surface of the hub body and fix the connecting crown inside the hub body.

As a result, thanks to the connecting system of the invention, the cleaning and replacement of the parts is easier, since it is a system that allows the easy manual removal of the elastic ring and the connecting crown.

In this way, considerable savings can be made in cycle maintenance costs, since it allows parts to be replaced without the need to change the wheel or hub completely.

BRIEF DESCRIPTION OF THE FIGURES

The details of the invention can be seen in the accompanying figures, which are not intended to limit the scope of the invention.

DETAILED DESCRIPTION OF THE INVENTION

Figure 2:
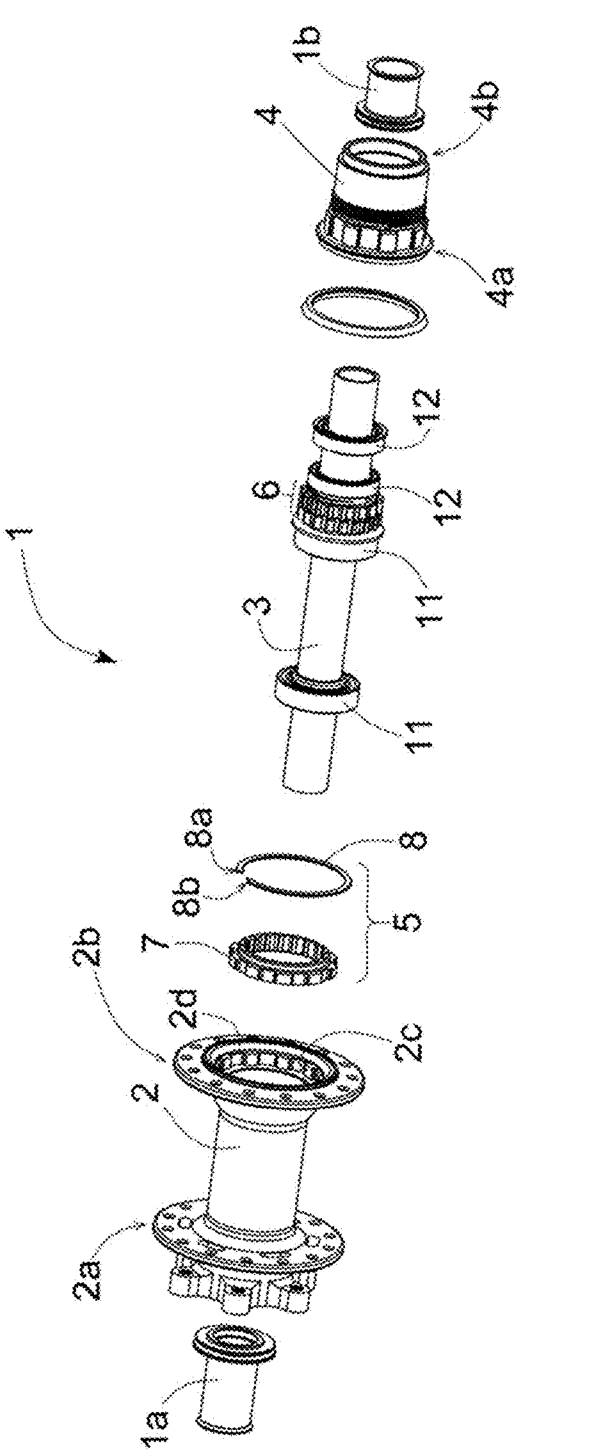
FIG. 2 shows an exploded perspective view of the rear hub of the invention.
Figure 3:
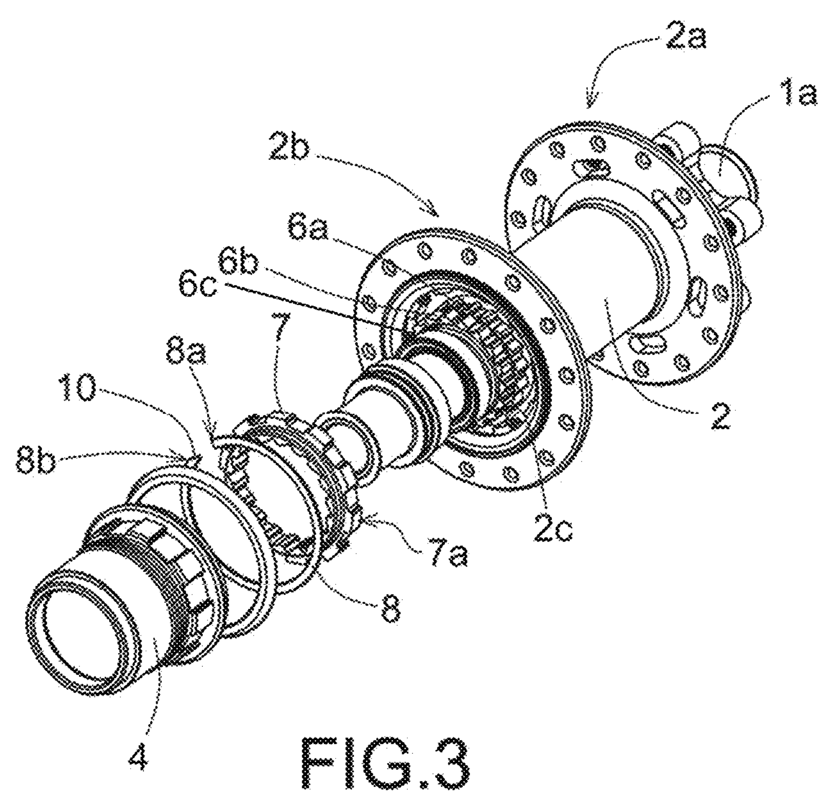
FIG. 3 shows a locally enlarged exploded view of the connecting mechanism between the hub and the freehub.
Figure 4:
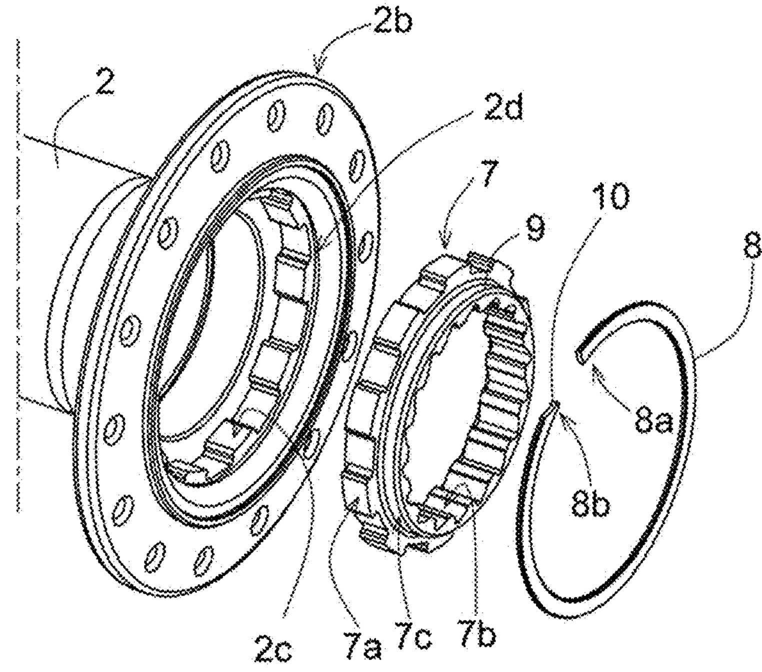
FIG. 4 shows a locally enlarged view of the connection mechanism of the invention between the hub body and the freehub.

The invention refers to a rear hub system (1) of a bicycle. Specifically, it relates to the connecting mechanism (5) of the body (2) and the freehub body (4) of a rear hub (1) of a bicycle as seen in FIGS. 2, 3 and 4.

Figures 1, 1A:
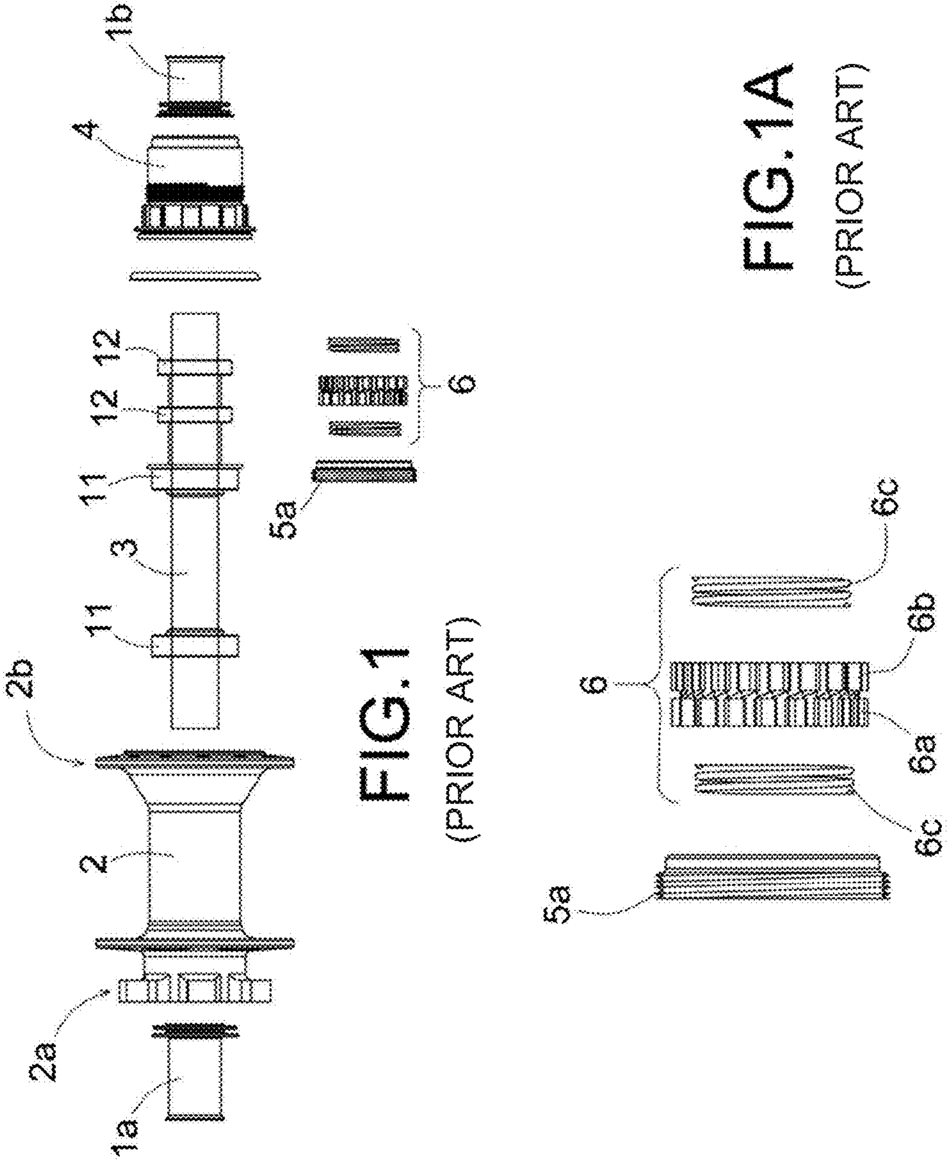
FIG. 1 shows a perspective view of a bicycle rear hub that is part of the state of the art.
FIG. 1A shows a perspective view of the connecting mechanism between the hub body and the freehub body in an embodiment that is part of the state of the art.

FIGS. 1 and 1A show an exploded view and a locally enlarged view of a rear hub system (1) known as a ratchet system, which comprises, from left to right, a distal stop (1*a*), a body (2), an axle (3) with wheel bearings (11, 12), a freehub body (4) and a proximal stop (1*b*). The rear hub (1) between the body (2) and the freehub body (4) comprises a connecting part (5*a*) and a freewheel system (6). In this ‘ratchet’ type of rear hub, the freewheel system (6) works through the interaction between the connecting part (5*a*), which is normally externally threaded and has internal splines, and the two rings (6*a*, 6*b*) facing each other, with external splines and laterally toothed with equal and complementary lateral teeth, pushed by two springs (6*c*) external to them, which make up the freewheel system (6) as shown in FIG. 1A. The connecting part (5*a*) which is normally threaded externally for fastening to the body (2) and internally splined for holding the freewheel system (6), is the most important part in the connection and fastening of the freehub body (4) to the body (2). As a result, and based on the workload it undergoes after continued use, it generates problems when it has to be replaced, as mentioned above.

Therefore, the invention refers to a bicycle wheel rear hub (1) that also comprises a cylindrical body (2) that surrounds an axle (3) and where at a distal end (2*a*) it comprises a distal stop (1*a*) and at a proximal end (2*b*) a freehub body (4) is attached by means of a connecting mechanism (5), where the freehub body (4) comprises a cylindrical body, a freewheel system (6) within it and a proximal stop (1*b*) at a proximal end (4*b*) of the freehub body (4). However, as shown in FIG. 2, the body (2) of the rear hub (1) of the invention is characterized in that the connecting mechanism (5) between the body (2) and the freewheel system (6) comprises a connecting crown (7) and an elastic ring (8), which are the key innovative parts of the invention.

On the one hand and preferably, the connecting crown (7) comprises an external crenellated and/or splined surface (7*a*), an inner radially toothed surface (7*b*) and a lateral surface (7*c*). The external crenellated and/or splined surface (7*a*) and the internal toothed surface (7*b*) act as a support and link between the body (2) of the hub (1) and the rings (6*a*, 6*b*) of the freehub body (4) responsible for the effect of the freewheel system (6), ensuring the solidity and firmness necessary for holding the freehub body (4), by means of a sliding adjustment. In other words, the outer surface (7*a*) and inner surface (7*b*) require shapes which may be regular or irregular, but which must be complementary to the surfaces with which they are going to be matched. The lateral surface (7*c*) comprises a circular recess (9) where the elastic ring (8) is attached or seated.

Also, preferably, the crenellated and/or splined outer surface (7*a*) of the connecting crown (7) is complementary to the inner surface (2*c*) of the body (2), while the inner radial surface (7*b*) of the connecting crown (7) is toothed and complementary to the outer surface of the ring (6*a*) of the freewheel system (6) as seen in FIG. 3.

On the other hand, as shown in FIGS. 3 and 4, the elastic ring (8) of the rear hub (1) of the invention comprises a circular flat body with two free ends (8*a*, 8*b*) so as to be able to expand towards the inner surface (2*c*) of the body (2) and fit into a groove or channel (2*d*) in the inner radial surface (2*c*) of the proximal end (2*b*) of the body (2) of the hub (1) and block the sliding movement of the connecting crown (7), guaranteeing the absolute immobility of the connecting crown (7) inside the body (2). In addition, the free end (8*b*) comprises a tab (10) that facilitates the extraction of the elastic ring (8) from the body (2) when it is seated and expanded in the groove (2*d*) of the inner surface (2*c*) of the body (2).

Optionally, the freewheel system (6) comprises at least two moving rings (6*a*, 6*b*) that are laterally toothed and have external splines, facing each other, and at least two springs (6*c*) on the other side from the toothed surface of the rings (6*a*, 6*b*), which together with the rotation of the pedals determine the operation of the freewheel system (6). In other words, the first ring (6*a*) fits externally with the complementary splines of the inner radial surface (7*b*) of the connecting crown (7) and the second ring (6*b*) fits laterally with the complementary teeth of the first ring (6*a*) and externally with the inner surface of the freehub body (4). The teeth of the rings (6*a*, 6*b*) form a wedge shape, one side being inclined and the other straight. In this way, when pedalling on the bicycle, the sprockets make the freehub body (4) turn and thus turn the rings (6*a*, 6*b*) of the freewheel system (6), which are facing each other and in contact due to the fact that the springs (6*c*) are partially extended, exerting pressure on one ring (6*a*) against the other (6*b*). Therefore, when the pedals turn in the direction of travel, the teeth mesh, turning the body (2) and with it the bicycle wheel. However, when pedalling is stopped or reversed, the springs (6*c*) are slightly compressed and the freewheel system (6) disengages releasing and allowing both rings (6*a*, 6*b*) to slide, since the teeth rotate in the opposite direction allowing the wheel to turn when the pedals are immobile or rotate in the opposite direction to the direction of travel.

Another possible embodiment of the invention is when the freehub body (4) comprises at least one pawl system on an external surface of the distal end (4*a*) and the connecting crown (7) comprises an inner radially toothed surface (7*b*) complementary to the pawls of the freehub body (4). Alternatively, in another embodiment, the connecting crown (7) comprises a lateral radially toothed surface (7*c*) complementary to the outer surface of a ring (6*b*) of the free wheel system (6), where in this case, the use of one of the toothed rings (6*a*) is eliminated, being the connecting crown (7) the connecting mechanism (5) and ring (6*a*) at the same time.

Additionally, as shown in the Figures, the rear hub (1) of the invention comprises wheel bearings (11, 12) on the axle (3), where the wheel bearings (11) are those located inside the body (2) and the wheel bearings (12) are those located inside the freehub body (4), allowing and helping them to rotate when necessary.

For all of the above and thanks to the connecting mechanism (5) of the invention, the problem of over-tightening of the threaded connecting part (5*a*) is solved, facilitating the disassembly and replacement of the necessary parts without the need for tools or special knowledge, thus simplifying and reducing the cost of maintenance work. In addition, it is possible to prolong the life of the hub (1) and therefore of the bicycle wheel.

The invention claimed is:

1. A rear bicycle wheel hub comprising a first cylindrical body that surrounds an axle, wherein the rear hub comprises a distal stop at a distal end and the rear hub comprises a freehub body at a proximal end attached by a connecting mechanism, where the freehub body comprises a second cylindrical body that surrounds a freewheel system and a proximal stop at a proximal end of the freehub body that closes and fixes the rear hub, wherein the connecting mechanism between the first body and the freewheel system of the freehub body comprises a connecting crown and an elastic ring, where the connecting crown comprises a lateral surface with a circular groove where the elastic ring is fitted so that the elastic ring can expand towards an internal surface of the first body and fix the connecting crown inside the first body.

2. The rear bicycle wheel hub, according to claim 1, where the connecting crown comprises an external surface complementary to the inner surface of the first body and an inner radial surface complementary to the outer surface of at least one toothed ring of the freewheel system.

3. The rear bicycle wheel hub, according to claim 1, wherein the elastic ring comprises a circular flat body with two free ends where the free end has a tab.

4. The rear bicycle wheel hub, according to claim 1, wherein the body comprises a groove or channel at the proximal end of the inner surface.

5. The rear bicycle wheel hub, according to claim 1, wherein the free wheel system comprises at least two toothed rings laterally facing each other with external teeth or splines complementary to the inner surfaces of the connecting crown and the freehub body.

6. The rear bicycle wheel hub, according to claim 1, wherein the body comprises at least one wheel bearing inside.

7. The rear bicycle wheel hub, according to claim 1, wherein the freehub body comprises at least one wheel bearing inside.

* * * * *